United States Patent [19]

Shimada

[11] 3,832,032

[45] Aug. 27, 1974

[54] LENTICULAR REAR PROJECTION SCREEN

[75] Inventor: Satoshi Shimada, Tokyo, Japan

[73] Assignee: Sony Corporation, Tokyo, Japan

[22] Filed: Apr. 20, 1973

[21] Appl. No.: 352,974

[30] Foreign Application Priority Data

Apr. 25, 1972 Japan................................ 47-49418

[52] U.S. Cl................................ 350/128, 350/167
[51] Int. Cl. ........................................... G03b 21/60
[58] Field of Search............................ 350/128, 167

[56] References Cited
UNITED STATES PATENTS 2,618,198   11/1952   Luboshez............................ 350/128

Primary Examiner—Richard A. Wintercorn
Attorney, Agent, or Firm—Lewis H. Eslinger, Esq.; Alvin Sinderbrand, Esq.

[57] ABSTRACT

A rear projection screen in a projector which uses a cathode ray tube as an image light source has one side of the screen formed with a multiplicity of parallel lenticular ridges, while the other side of the screen has a plane surface provided with a plurality of light diffusing stripe-like areas arranged alternately thereacross. The lenticular ridges and the light diffusing stripe-like areas cooperate to provide light emerging from the screen with a horizontal diffusing angle that is controllably greater than the vertical diffusing angle thereof, and the light absorbing stripes are operative to absorb ambient light and thereby avoid deterioration of the contrast of an image projected through the screen onto the plane surface thereof.

9 Claims, 9 Drawing Figures

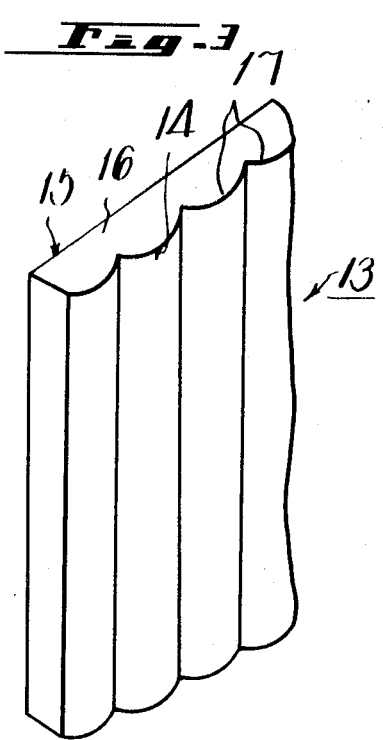
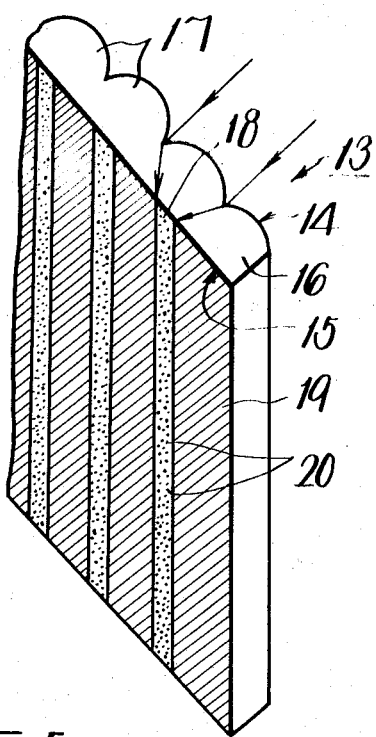
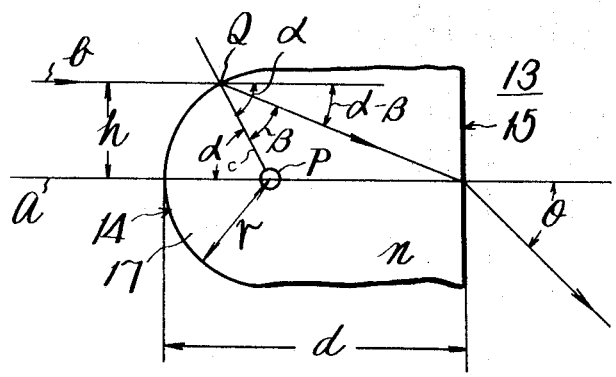

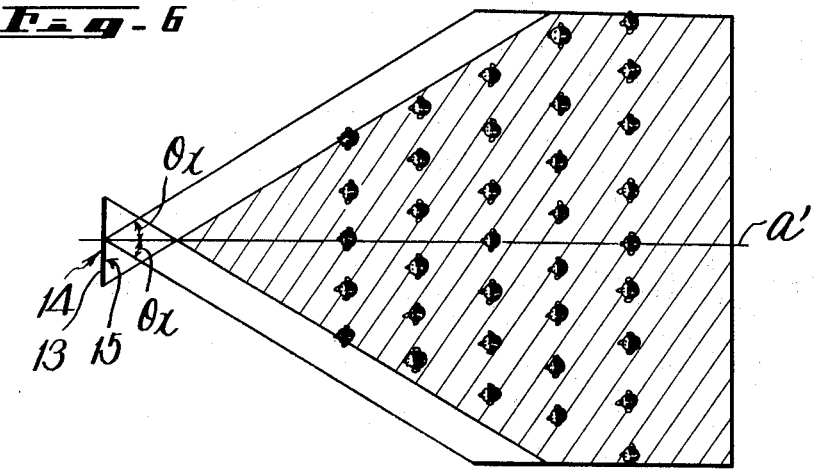
Fig-6
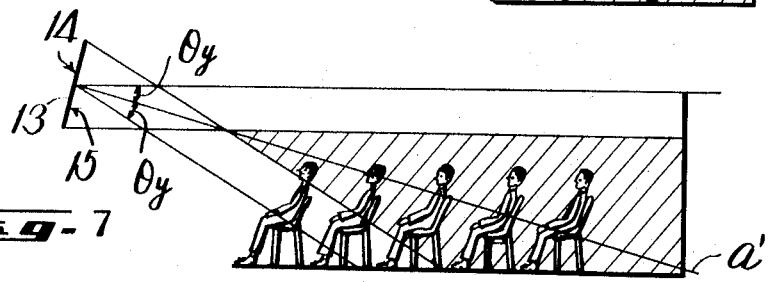
Fig-7
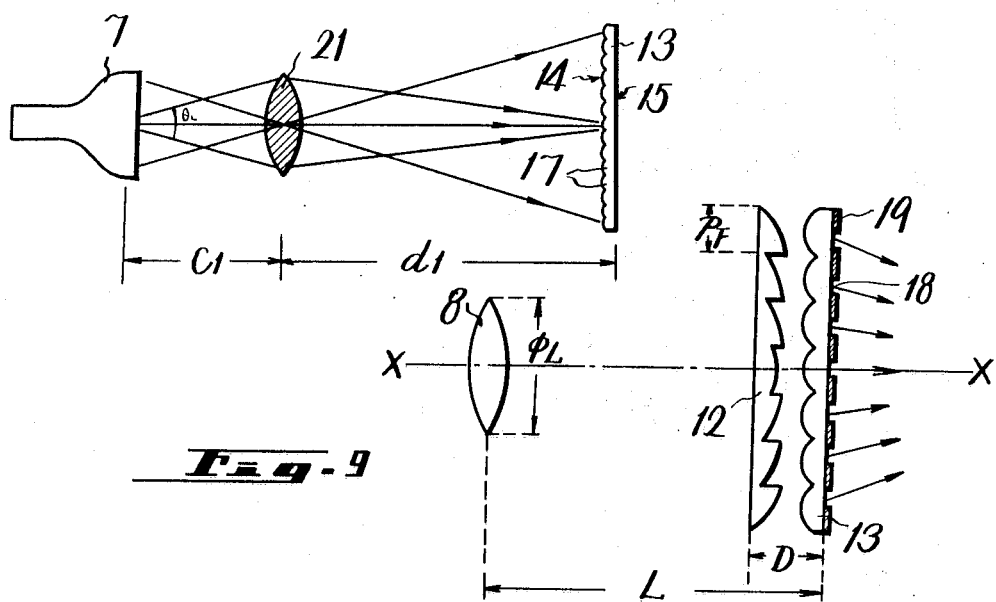
Fig-8
Fig-9

3,832,032

LENTICULAR REAR PROJECTION SCREEN

BACKGROUND OF THE INVENTION

1. Field of the Invention

This invention relates generally to a rear projection screen and more particularly to a rear projection screen for use with a relatively low intensity image light source, such as, a cathode ray tube.

2. Description of the Prior Art

In the prior art, a translucent glass or synthetic plastic sheet has been used as a rear projection screen. However, with such a rear projection screen, ambient light, for example, from an overhead or ceiling light, may be reflected by the surface of the screen toward an observer and thereby deteriorate the contrast of an image projected to the screen.

Further, in existing rear projection screens, the light from an image source is irregularly diffused by the screen in all directions and portions of the light diffused laterally in opposite directions and also vertically up and down from the screen may not reach the observers so that the image, as viewed, is insufficiently illuminated.

SUMMARY OF THE INVENTION

Accordingly, it is an object of this invention to provide a rear projection screen that avoids the above mentioned disadvantages of existing screens.

More specifically, it is an object of the invention to provide a rear projection screen which can be used with normal ambient illumination.

Another object is to provide a rear projection screen which can be used in a projector having a relatively low intensity image light source such as, for example, the cathode ray tube of a television receiver.

A further object is to provide a rear projection screen with controlled diffusion characteristics.

In accordance with this invention, the disadvantages encountered in the prior art are avoided by providing a multiplicity of convex lenticular ridges extending parallel to each other in the vertical direction on the rear surface of the screen, while the other side of the screen has a plane surface with at least stripe-like areas thereof corresponding to the lenticular ridges being roughened, preferably by randomly arranged, horizontally extending minute grooves or scratches, to give controlled diffusion characteristics to the screen and accordingly to obtain sufficient brightness of an image on the screen.

In accordance with another feature of the invention, stripe-like areas having light absorbing characteristics are interspersed between the light diffusing or roughened stripelike areas for absorbing ambient light and thereby avoiding deterioration of the contrast of an image on the screen by ambient light reflected from the latter.

The above, and other objects, features and advantages of the invention, will be apparent in the following detailed description which is to be read in conjunction with the accompanying drawings.

BRIEF DESCRIPTION OF THE DRAWINGS

FIG. 3 is a fragmentary greatly enlarged perspective view of a portion of the rear projection screen according to this invention, as viewed from the rear side;

FIG. 4 is a view similar to that of FIG. 3, but showing the screen as viewed from the front side thereof;

FIG. 5 is an enlarged schematic diagram illustrating the optical path of a light ray passing through the screen;

FIG. 6 is a diagrammatic plan view showing the horizontal diffusion angle of light by the screen according to this invention;

FIG. 7 is a diagrammatic side view showing the vertical diffusion angle of light by the screen according to this invention;

FIG. 8 is a schematic diagram representing the optical relationship of the light source, lens system and screen in a projector according to this invention; and FIG. 9 is a diagram representing the optical relationship of the main lens, correction lens and screen in a projector according to this invention.

DESCRIPTION OF THE PREFERRED EMBODIMENT

Figure 1:
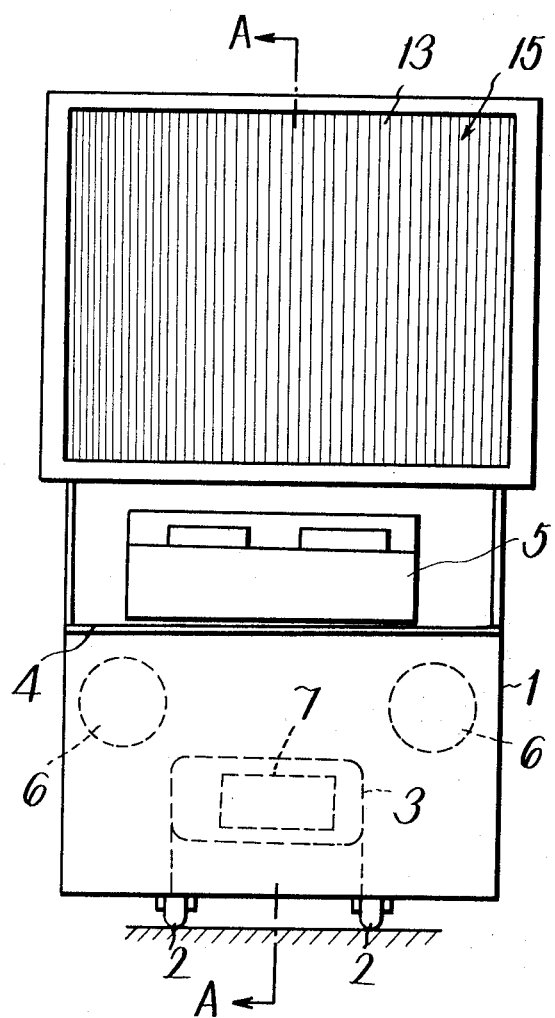
FIG. 1 is a front elevational view of a projector employing a rear projection screen according to the invention.
Figure 2:
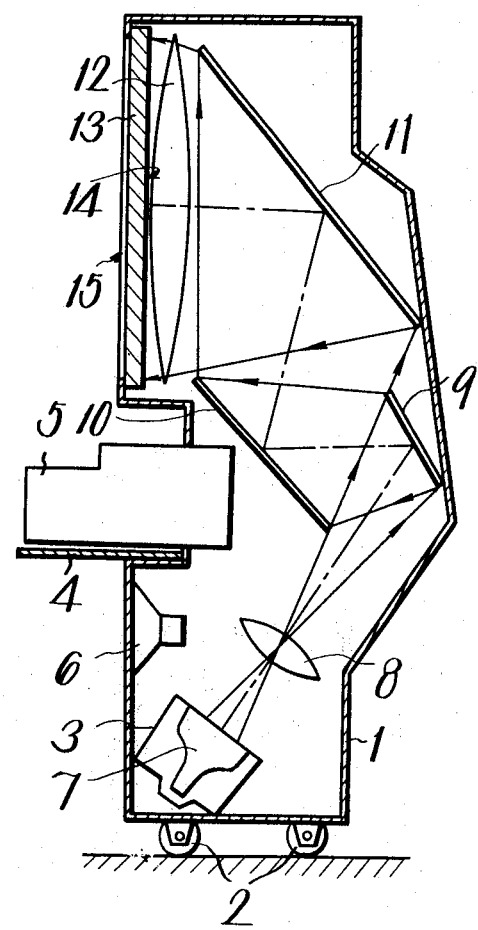
FIG. 2 is a vertical sectional view taken along the line A—A on FIG. 1.

Referring to FIGS. 1 and 2 in detail, it will be seen that, in a rear screen projector according to this invention, a cabinet 1, which may be movable on wheels 2, houses a television receiver 3 having a cathode ray tube 7 which constitutes an image light source, a main lens 8, reflection mirrors 9, 10 and 11, a correction lens 12, and a screen 13 which extends across an opening at the front of cabinet 1. As shown, the cabinet 1 may have a table or shelf 4 for supporting a video tape recorder 5 so that the television receiver may be operated alternatively by the video components of a broadcast television signal or by a recorded video signal that is played-back or reproduced by video tape recorder 5. Further, speakers 6 may be provided for reproducing the audio component of the broadcast or recorded television signal.

With the projector shown on FIGS. 1 and 2, an image reproduced by the television receiver 3 on the face of its cathode ray tube 7 is focused on the front surface 15 of screen 13 after passing through main lens 8, being reflected by first, second and third reflection mirrors 9, 10 and 11 and being converged slightly toward the center by correction lens 12.

As shown on FIGS. 3 and 4, the rear projection screen 13 according to this invention consists of a transparent glass or synthetic plastic sheet 16. The rear side 14 of sheet 16 is provided with a multiplicity of convex parallel vertical lenticular ridges 17, while the other side, that is, the front side 15 of the sheet has a plane surface. The plane or flat front surface 15 of sheet 16 has spaced-apart, parallel stripe-like light diffusing areas 18 extending vertically thereon and corresponding to the lenticular ridges 17, and the stripe-like areas 19 interposed between the light diffusing areas 18 are coated with a light absorbing material. The stripe-like areas 18 are preferably made light diffusing by the roughening thereof, for example, by means of numerous, minute scratches or microgrooves 20 formed therein. Such grooves 20, which may have a depth of only several microns, are preferably provided in a random arrangement with their longitudinal directions being parallel to each other in the horizontal direction, that is, at right angles to the longitudinal directions of the stripe-like areas 18. The light diffusing stripe-like areas 18 are laterally located relative to the respective lenticular ridges 17 so that the element of the projected image which is acted upon by each lenticular ridge 17 will be focused in the respective stripe-like area 18 on front surface 15.

Since the lenticular ridges 17 are in the form of convex cylindrical lenses, the light rays passing therethrough are converged horizontally to a focus at the respective stripe-like area 18 and then are horizontally diffused upon emerging from sheet 16 at the front surface 15. The micro-grooves 20 in stripe-like areas 18 further promote the vertical and horizontal diffusion of the light emerging at such areas. Thus, the horizontal diffusion angle is determined by the combined effect of lenticular ridges 17 and micro-grooves 20, while the vertical diffusion angle is determined by the micro-grooves alone. If the micro-grooves 20 are arranged with their longitudinal axes in random directions so that the diffusing effect thereof will be substantially equal in the horizontal and vertical directions, the combined horizontal diffusing effect of such micro-grooves 20 and of lenticular ridges 17 may be excessive and result in undesirably reduced brightness of the projected image viewed by an observer. However, when the micro-grooves 20 are in a random arrangement with their longitudinal axes extending parallel to each other in the horizontal direction, as is preferred in accordance with this invention, the diffusion effect of such micro-grooves in the horizontal direction is reduced or minimized, and a desirable relation is obtained between the horizontal and vertical diffusion angles, as described below.

The horizontal diffusing effect of each of the lenticular ridges 17 will now be described specifically with reference to FIG. 5, in which:

The radius of each lenticular ridge 17 is indicated at $r$; the central axis passing through the center P of each lenticular ridge 17 perpendicular to the plane front surface 15 of screen 13 is indicated at $a$; a light ray parallel to the axis $a$ is indicated at $b$; the point at which the light ray $b$ enters the lenticular ridge 17 is indicated at Q; the distance between the axis $a$ and the light ray $b$ is $h$; the line passing through the points P and Q is $c$; the angle between the light ray $b$ and the line $c$ is $\alpha$; the refraction angle of the light ray $b$ at the point Q is $(\alpha-\beta)$; the angle between the axis $a$ and the light ray emerging from the screen 13 at its front surface 15, that is, the horizontal diffusion angle of the light by the screen 13 is $\theta$; the maximum thickness of the screen 13 is $d$; and the refractive index of the screen 13 is $n$. The following equations can be derived:

$$n = \sin\alpha/\sin\beta \tag{1}$$

$$n = \sin\theta/\sin(\alpha-\beta) \tag{2}$$

$$h = r\sin\alpha \tag{3}$$

From the above equations, the diffusion angle $\theta$ can be expressed as $$\theta = \sin^{-1}[n\sin\alpha - \sin^{-1}(1/n\cdot\sin\alpha)] \tag{4}$$

From the above equation (4) it will be understood that the diffusion angle $\theta$ in the X- or horizontal direction can be determined by defining the angle $\alpha$.

It will be understood that, in the above derivation of the diffusion angle in the horizontal direction, hereinafter referred to as $\theta_x$, the diffusing effect of the micro-grooves 20 in stripe-like areas 18 has been neglected or ignored. However, in practice, the horizontal diffusion angle $\theta_x$ is made slightly larger than the value calculated from equation (4) by the light diffusion effect of the micro-grooves 20. As previously noted, the effect of the micro-grooves 20 on the horizontal diffusion angle is minimized by the described arrangement of the micro-grooves or scratches with their longitudinal directions extending horizontally.

On the other hand, the diffusion angle of light by the screen 13 in the Y- or vertical direction is determined by the depth and shape of the micro-grooves 20 formed in the stripe-like areas 18.

Referring now to FIGS. 6 and 7 which illustrate the horizontal light diffusion angle and the vertical light diffusion angle, respectively, it will be seen that the eye level differences among observers in the vertical direction is smaller than the difference between the eye positions in the horizontal direction, so that the vertical light diffusion angle $\theta_y$ can be selected to be smaller than the horizontal light diffusion angle $\theta_x$, whereby to substantially enhance the brightness of the image. Further, since the diffusion light from the projected image on to the screen 13 need only be diffused toward one side of the central axis $a'$ of screen 13, the following condition can be established.

$$\theta_y < \theta_x < 90°$$

The relationship between the light diffusion angle and the brightness of the projected image will now be discussed with reference to FIG. 8 which schematically illustrates the optical relationship of the cathode ray tube 7, a lens system 21 and the screen 13. In FIG. 8, the lens system 21 represents the optical system of FIG. 1 made up of the main lens 8, the correction lens 12 such as a Fresnel lens, and the reflection mirrors 9,10 and 11. If it is assumed that light transmissivity and the light reflectivity of lens system 21 are, as a whole, represented by $\eta_L$, that the light transmissivity of screen 13 is $\eta_S$, that $n_1$ is the ratio of the distance $C_1$ between cathode ray tube 7 and lens system 21 to the distance $d_1$ between lens system 21 and screen 13, that the angle from the center of cathode ray tube 7 to the periphery of lens system 21 is $\theta_L$, and that the brightness on the face plate of cathode ray tube 7 is $B_0$, then the brightness $B_S$ on the screen 13 can be expressed by the following equation:

$$B_S = \eta_L \cdot \eta_S \cdot 1/n_1^2 \cdot (\pi/4) \cdot \theta_L^2/\theta_x \cdot \theta_y \cdot B. \tag{5}$$

As may be apparent from the above equation (5), the brightness $B_S$ at the front surface 15 of screen 13 is increased as the horizontal light diffusion angle $\theta_x$ and the vertical light diffusion angle $\theta_x$ are decreased. Thus, by making the vertical light diffusion angle $\theta_y$ smaller than the horizontal light diffusion angle $\theta_x$, the brightness $B_S$ on the screen 13 can be increased as compared with the brightness achieved when substantially equal light diffusion angles are provided in the vertical and horizontal directions.

With the projector described above in connection with FIGS. 1 and 2, an image reproduced by the cathode ray tube 7, or the light therefrom, passes through the main lens 8 and is reflected by the mirrors 9,10 and 11 to be focused on the light diffusing stripe-like areas 18, of front surface 15 of the screen 13 and thereafter diffused by the micro-grooves 20 formed in such areas 18. With the screen 13 according to the invention, the above condition $90°>\theta_x>\theta_y$ can be easily satisfied for the light passed through the screen 13, and hence light loss by diffusion towards the opposite sides of the screen 13, the floor and the ceiling can be reduced or avoided. Accordingly, the brightness of the image on the screen 13, when viewed in predetermined directions by the observers, can be enhanced.

Further, by reason of the light absorbing coating provided on the front surface 15 of the screen 13 in the stripe-like areas 19 between the light diffusing areas 18, ambient light, for example, from an overhead light in the ceiling is absorbed on striking the areas 19 to substantially prevent the inflection of the ambient light from the screen 13 and hence to avoid deterioration of the contrast ratio of the projected image on the screen 13.

With the embodiment described above, the directivity of light is emphasized so that observers positioned directly in front of screen 13, that is, along the center line $a'$ in FIG. 6, may feel that the brightness of the image portion near the vicinity of the periphery of screen 13 is less than that of the image portion at the center of the screen. However, the foregoing effect can be avoided if the correction lens 12 is in the form of a Fresnel lens, as shown diagrammatically on FIG. 9. The Fresnel lens 12 causes lateral or horizontal convergence toward the central axis X—X of light rays which arrive at the lens 12 parallel to the axis X—X after emerging from main lens 8 and being reflected by the mirrors (not shown on FIG. 9). When the described Fresnel lens 12 is employed, it is desirable that the light diffusing stripe-like areas 18 which are spaced from axis X—X be displaced laterally inward toward such axis from the longitudinal medians of the respective lenticular ridges 17 by distances which progressively increase in accordance with the distance of the respective area 18 from the axis X—X, as shown on FIG. 9.

With such an arrangement, when the reproduced image is observed from a position along the axis X—X extending through the center of the screen 13, it can be seen with uniform brightness all over the screen 13. If the diameter of the main lens 8 is $\phi_L$, the pitch or distance between the adjacent lens elements of Fresnel lens 12 is $P_F$, the distance between the Fresnel lens 12 and the screen 13 is D, and the distance between the main lens 8 and the screen 13 is L, as on FIG. 9, and if the condition $P_F < D/L \cdot \phi_1$ is satisfied, then the Moire pattern which may otherwise be caused by the Fresnel lens 12, the main lens 8 and the stripe-like areas 18 of the screen 13 can be avoided.

In producing the rear projection screen 13 according to this invention, the following method is preferably employed:

Firstly, the lenticular ridges 17 are formed at the rear surface 14. Such ridges 17 can be formed by suitably cutting the sheet 16 of transparent plastic material which is destined to form the screen 13, but it is preferred to provide master molds, rollers or matrices by which the mass production of the screens can be obtained.

Thus, for example, the sheet 16 which is to form the screen 13 may be provided by molding synthetic plastic between two rollers or matrices, one having concave lenticular grooves and the other having a plane surface to respectively form the lenticular ridges 17 and plane front surface 15. Similarly, a glass screen can be formed by casting or molding glass between suitably shaped molds.

Next, the micro-grooves 20 are formed in the front surface 15 of the sheet 16, for example, by sand blasting or the like. Preferably, the sand blasting is directed in the horizontal direction of the final screen 13 so that the resulting micro-grooves 20 will have their longitudinal axes parallel to the horizontal direction of the screen 13.

After the sand-blasting a photo-sensitive agent or material, such as, for example, polyvinyl-alcohol or the like, is applied to the front surface 15 of sheet 16. Then, the photo-sensitive material is exposed to light passing through the sheet 16 from the rear surface 14 and, by reason of the lenticular ridges 17, such photo-sensitive material is exposed and substantially hardened at the stripe-like areas 18 corresponding to the ridges 17. The exposed photo-sensitive material is then rinsed or washed with water to remove or wash away the non-hardened photo-sensitive material from those portions of front surface 15 corresponding to the stripe-like areas 19. Thereafter, a light absorbing material, for example, black pigment, is coated over the front surface 15 of sheet 16 including those portions covered by the hardened photo-sensitive material and which correspond to the stripe-like areas 18 of the completed screen 13. At the portions of front surface 15 which correspond to stripe-like areas 19, that is, in the regions from which the non-hardened photo-sensitive material has been removed, the coating of light absorbing material is strongly adhered to sheet 16 by reason of the micro-grooves or scratches 20. Finally, the hardened photo-sensitive material at the stripe-like areas 18 is removed, for example, by means of a suitable solvent, whereby any light absorbing material which coated such hardened photo-sensitive material is also removed, so as to obtain the completed rear projection screen 13 as described above.

It will be seen that, in the above described rear projection screen according to this invention, the rear surface of the screen is provided with a multiplicity of convex parallel vertical lenticular ridges for determining the horizontal diffusion angle, while the front surface of the screen is provided with horizontally directed micro-grooves for determining the vertical diffusion angle of light by the screen which can be made smaller than the horizontal diffusion angle to obtain a sufficiently bright image on the screen.

Further, the light absorbing material covering the front surface of the screen with the exception of the stripe-like areas at which the projected image elements are focused is effective to absorb the ambient light impinging on the screen and hence to avoid deterioration of the contrast ratio of the image on the screen.

Accordingly, even if a cathode ray tube of a television receiver providing an image of relatively low brightness is employed as the light source of a projector including the screen according to this invention, an image can be formed on the screen of the projector with sufficient brightness and contrast ratio.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope and spirit of the invention.

What is claimed is:

1. A rear projection screen comprising a transparent sheet having a plane surface at one side of the sheet and its opposite surface constituted by a multiplicity of parallel lenticular ridges, said plane surface having a multiplicity of spaced-apart parallel light diffusing stripe-shaped areas each corresponding to a respective one of said lenticular ridges and extending parallel to the latter, said plane surface further having parallel light absorbing stripe-shaped areas interposed between said light diffusing stripe-shaped areas, said stripe-like areas extending vertically, and each of said light diffusing stripe-like areas being constituted by numerous micro-grooves which are arranged so that light escaping from said sheet at said light diffusing stripe-like areas of the plane surface has a larger light diffusion angle in the horizontal direction than in the vertical direction.

2. A rear projection screen according to claim 1, in which said micro-grooves extend generally parallel to each other in directions substantially at right angles to the longitudinal directions of said stripe-like areas.

3. A rear projection screen according to claim 1, in which said micro-grooves are in a random arrangement in the respective stripe-like area.

4. A rear projection screen according to claim 3, in which each of said lenticular ridges constitutes a cylindrical lens element.

5. A rear screen projector comprising, an image light source, a transparent sheet having a plane front surface and a rear surface constituted by a multiplicity of vertically extending, parallel lenticular ridges, optical projection means for focusing the image from said light source through said sheet onto said plane front surface, said plane front surface of the transparent sheet having a multiplicity of spaced-apart parallel light diffusing stripe-shaped areas each corresponding to a respective one of said lenticular ridges and extending parallel to the latter, and said plane front surface further having parallel light absorbing stripe-shaped areas interposed between said light diffusing stripe-shaped areas, each of said light diffusing stripe-like areas having a larger light diffusing angle in the horizontal direction than in the vertical direction as to light emerging from said sheet at said plane front surface thereof.

6. A rear screen projector according to claim 5, in which each of said light diffusing stripe-like areas has numerous micro-grooves exending horizontally in a random arrangement with respect to each other.

7. A rear screen projector according to claim 6, in which each of said lenticular ridges constitutes a cylindrical lens element.

8. A rear screen projector according to claim 5, in which said optical projection means includes a correcting Fresnel lens disposed in back of said transparent sheet and being operative to deflect horizontally toward a central axis the light rays that pass through the Fresnel lens from said image light source, and said light diffusing stripe-like areas which are spaced from said central axis are displaced laterally inward toward said axis from the longitudinal medians of the respective lenticular ridges by distances which progressively increase in accordance with the distance of the respective light diffusing stripe-like area from said central axis.

9. A rear screen projector according to claim 8, in which said Fresnel lens includes parallel arranged lens elements substantially aligned with said lenticular ridges, said optical projection means further includes a main focusing lens interposed between said image light source and said Fresnel lens, and the pitch $P_F$ of said lens elements of the Fresnel lens conforms to the following inequality:

$$P_F < D/L \cdot \phi_L$$

in which D is the distance from said Fresnel lens to said sheet, L is the distance from said main focusing lens to said sheet, and $\phi_L$ is the diameter of said main focusing lens.

* * * * *